US009825276B2

(12) United States Patent
Ahn et al.

(10) Patent No.: US 9,825,276 B2
(45) Date of Patent: Nov. 21, 2017

(54) BATTERY PACK INCLUDING A PROTECTION CIRCUIT MODULE FOR UNIT BATTERIES

(71) Applicant: SAMSUNG SDI CO., LTD., Yongin-si, Gyeonggi-do (KR)

(72) Inventors: Byung-Kook Ahn, Yongin-si (KR); Dae-Yon Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/328,666

(22) Filed: Jul. 10, 2014

(65) Prior Publication Data

US 2015/0017484 A1    Jan. 15, 2015

Related U.S. Application Data

(63) Continuation of application No. 14/077,179, filed on Nov. 11, 2013, now Pat. No. 9,385,362.

(Continued)

(51) Int. Cl.
*H01M 2/24* (2006.01)
*H01M 2/34* (2006.01)
(Continued)

(52) U.S. Cl.
CPC .......... *H01M 2/34* (2013.01); *H01M 2/1022* (2013.01); *H01M 2/1061* (2013.01);
(Continued)

(58) Field of Classification Search
CPC .......... H01M 10/425; H01M 10/4271; H01M 2/1061; H01M 2/202; H01M 2/204;
(Continued)

(56) References Cited

U.S. PATENT DOCUMENTS

2003/0146734 A1    8/2003 Kozu et al.
2005/0202315 A1*   9/2005 Sugeno et al. ................. 429/156
(Continued)

FOREIGN PATENT DOCUMENTS

DE    10 2011 079 289 A1    1/2013
EP    2 579 359 A2    4/2013
(Continued)

OTHER PUBLICATIONS

EPO Search Report dated Nov. 14, 2014, for corresponding European Patent application 13194977.8, (7 pages).
(Continued)

*Primary Examiner* — Maria J Laios
*Assistant Examiner* — Angela Martin
(74) *Attorney, Agent, or Firm* — Lewis Roca Rothgerber Christie LLP

(57) ABSTRACT

A battery pack includes a plurality of unit batteries arranged side by side in a first direction, each unit battery including a can accommodating an opening including an electrode assembly having a first electrode plate, a second electrode plate, and a separator between the electrode plates, and a cap plate sealing the opening. The plurality of unit batteries may be arranged side by side in the first direction with all the cap plates exposed in the same direction. The battery pack may further include a protection circuit module adjacent to the cap plate with a circuit board extending in the first direction and a protection device coupled to it, wherein each unit battery further includes a first terminal on a first area of the cap plate and a second terminal on a second area of the cap plate, each coupled to the unit battery and the protection circuit module.

11 Claims, 4 Drawing Sheets

Related U.S. Application Data

(60) Provisional application No. 61/844,370, filed on Jul. 9, 2013.

(51) Int. Cl.
  *H01M 2/10* (2006.01)
  *H01M 2/30* (2006.01)
  *H01M 10/42* (2006.01)
  *H01M 2/20* (2006.01)

(52) U.S. Cl.
  CPC ............. *H01M 2/204* (2013.01); *H01M 2/30* (2013.01); *H01M 10/425* (2013.01); *H01M 2/348* (2013.01); *H01M 2010/4271* (2013.01); *H01M 2200/00* (2013.01); *H01M 2220/30* (2013.01)

(58) Field of Classification Search
  CPC .......... H01M 2/206; H01M 2/34; H01M 2/24; H01M 2/212
  USPC .................................. 429/149, 156, 158, 160
  See application file for complete search history.

(56) References Cited

U.S. PATENT DOCUMENTS

| | | | |
|---|---|---|---|
| 2010/0052692 A1 | 3/2010 | Yano et al. | |
| 2010/0092860 A1* | 4/2010 | Seo et al. | 429/178 |
| 2010/0136408 A1 | 6/2010 | Koh et al. | |
| 2011/0039129 A1* | 2/2011 | Lee | H01M 2/0404 429/7 |
| 2011/0039131 A1 | 2/2011 | Moon | |
| 2011/0300414 A1* | 12/2011 | Baek | 429/7 |
| 2012/0052331 A1* | 3/2012 | Park | 429/7 |
| 2012/0142230 A1* | 6/2012 | Baek | 439/754 |
| 2012/0208052 A1* | 8/2012 | Kim | 429/82 |
| 2012/0214024 A1 | 8/2012 | Moon et al. | |
| 2012/0270074 A1 | 10/2012 | Koh | |
| 2012/0300396 A1 | 11/2012 | Bang et al. | |
| 2013/0089757 A1* | 4/2013 | Baek | H01M 2/0426 429/7 |
| 2013/0157084 A1* | 6/2013 | Bang et al. | 429/7 |
| 2013/0157085 A1 | 6/2013 | Bang et al. | |
| 2014/0072858 A1* | 3/2014 | Won | H01M 2/0404 429/121 |
| 2014/0212738 A1 | 7/2014 | Wöhrle et al. | |

FOREIGN PATENT DOCUMENTS

| | | |
|---|---|---|
| EP | 2 706 588 A1 | 3/2014 |
| JP | 2002-141052 | 5/2002 |
| KR | 10-2004-0062914 | 7/2004 |
| KR | 10-2011-0017821 | 2/2011 |
| KR | 10-2011-0130848 | 12/2011 |
| WO | WO 2011149224 A2 * | 12/2011 |

OTHER PUBLICATIONS

KIPO Notice of Allowance dated Dec. 5, 2014, for Korean Patent application 10-2013-0130323 (6 pages).

EPO Search Report dated Mar. 9, 2015, corresponding to European Patent application 13194977.8, (12 pages).

EPO Office action dated Nov. 18, 2015, for corresponding European Patent application 13194977.8, (4 pages).

U.S. Office action dated Sep. 29, 2015, for parent U.S. Appl. No. 14/077,179, (17 pages).

U.S. Notice of Allowance dated Mar. 1, 2016; issued in U.S. Appl. No. 14/077,179 (8 pages).

* cited by examiner

BATTERY PACK INCLUDING A PROTECTION CIRCUIT MODULE FOR UNIT BATTERIES

CROSS-REFERENCE TO RELATED APPLICATION

This application is a continuation of U.S. application Ser. No. 14/077,179, filed Nov. 11, 2013, which claims priority to and the benefit of U.S. Provisional Application No. 61/844,370, filed on Jul. 9, 2013, in the U.S. Patent and Trademark Office, the entire contents of both which are incorporated herein by reference.

BACKGROUND

1. Field

The present invention relates to a battery pack.

2. Description of the Related Art

With the development of wireless Internet or communication technology, use of portable computers, which may be operated by using a battery without a power supply device, has rapidly increased. In general, portable computers are widely used for work or personal purposes because of their compact designs, ease of portability, and high mobility. A portable computer may include an internal battery pack which allows extended use of the device in various places without being affected by a power supply device. The internal battery pack in these devices may include unit batteries that may be repeatedly discharged and recharged.

SUMMARY

One or more embodiments of the present invention relate to a battery pack, and in particular, to a structure of a battery pack.

According to an aspect of the present invention, there is provided a battery pack including a plurality of unit batteries arranged side by side in a first direction, each unit battery including a can having an opening, the can accommodating an electrode assembly having a first electrode plate, a second electrode plate, and a separator located between the first electrode plate and the second electrode plate, and a cap plate sealing the opening, wherein the plurality of unit batteries are arranged side by side in the first direction such that the cap plate of each of the unit batteries is exposed in the same direction. The battery unit may further include a protection circuit module adjacent to the cap plate of each of the unit batteries, the protection circuit module having a circuit board extending in the first direction and a protection device coupled to the circuit board, wherein each unit battery of the plurality of unit batteries further includes a first terminal on a first area of the cap plate and coupled to the unit battery and the protection circuit module; and a second terminal on a second area of the cap plate and coupled to the unit battery and the protection circuit module.

The circuit board of the battery pack may include at least one terminal hole, wherein an end portion of at least one of the first terminal or the second terminal is coupled to the terminal hole.

At least one of the first terminal or the second terminal of the battery pack may include a first surface parallel to the cap plate, a second surface bent away from the first surface in a direction substantially perpendicular to the first surface, and a third surface bent away from the second surface in a direction substantially perpendicular to the second surface and substantially parallel to the first surface.

The second surface of the first terminal or the second terminal of the battery pack may be adjacent to a first long side of the cap plate, and the circuit board may be on a plane adjacent to the second surface.

A height of the protection device of the battery pack may be equal to or less than a distance between the first long side of the cap plate and a second long side of the cap plate parallel and opposite to the first long side.

The circuit board of the battery pack may include at least one terminal hole, wherein the third surface is coupled to the terminal hole electrically connecting the at least one of the first terminal or the second terminal to the circuit board.

Each of the unit batteries of the battery pack may further include an electrode pin having a first polarity and located on the cap plate, wherein the cap plate has a second polarity that is different from the first polarity.

The first terminal of the battery pack may electrically couple the electrode pin and the protection circuit module, and the second terminal of the battery pack may electrically couple the cap plate and the protection circuit module.

The battery pack may further include a holder located between the first terminal and the cap plate, the holder insulating the cap plate from the first terminal while exposing the electrode pin.

The first terminal of the battery pack may further include a temperature cutoff.

Facing surfaces of adjacent unit batteries from among the plurality of unit batteries of the battery pack may be insulated from each other.

According to another aspect of the present invention, there is provided a battery pack including a plurality of unit batteries, each of the unit batteries including a can having an opening and including a metal material, an electrode assembly located inside the can and including a first electrode plate, a second electrode plate, and a separator between the first electrode plate and the second electrode plate, and a cap plate sealing the opening of the can; and a protection circuit module adjacent to the cap plate of each of the plurality of unit batteries, the protection circuit module including a circuit board and a protection device, wherein each unit battery of the plurality of unit batteries further includes a first terminal electrically coupling the protection circuit module and an electrode pin having a first polarity and located on the cap plate; and a second terminal electrically coupling the protective circuit module and the cap plate, the cap plate having a second polarity that is opposite to the first polarity.

The circuit board of the battery pack may include at least one terminal hole.

A portion of the first terminal and a portion of the second terminal of the battery pack may be coupled to the terminal hole.

The battery pack may further include a holder located between the first terminal and the cap plate, the holder insulating the cap plate from the first terminal while exposing the electrode pin.

The first terminal of the battery pack may include a first surface coupled to the electrode pin; a second surface bent away from the first surface; and a third surface bent away from the second surface and substantially parallel to the first surface.

The first surface of the first terminal of the battery pack may include a first portion and a second portion, wherein the first portion and the second portion are electrically coupled to each other through a temperature cutoff located between the first portion and the second portion.

The second terminal of the battery pack may include a first surface coupled to the cap plate, a second surface bent away from the first surface, and a third surface bent away from the second surface and substantially parallel to the first surface.

The battery pack may further include a connection on the cap plate, the connection piece directly coupled to the second terminal and including the same material as a material of the second terminal.

Facing surfaces of adjacent unit batteries from among the plurality of unit batteries of the battery pack may be insulated from each other.

DETAILED DESCRIPTION

The present invention will now be described more fully with reference to the accompanying drawings, in which embodiments of the present invention are shown. It should be understood, however, that there is no intent to limit embodiments of the present invention to the particular forms disclosed, but conversely, these embodiments of the present invention are to cover all modifications, equivalents, and alternatives falling within the spirit and scope of the present invention. In the following description of the present invention, a detailed description of known functions and configurations incorporated herein will be omitted when it may make the subject matter of the present invention unclear. It will be understood that, although the terms "first", "second", etc. may be used herein to describe various elements, these elements should not be limited by these terms. These terms are only used to distinguish one element from another. The terminology used herein is for the purpose of describing particular embodiments only, and is not intended to be limiting of the embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, parts, or combinations thereof, but do not preclude the presence or addition of one or more other features, integers, steps, operations, elements, parts, or combinations thereof. A function mark "I" may be used to mean "and" or "or" according to the context in which it is used.

Like numerals denote like elements throughout. It will also be understood that when a layer, film, region, or plate is referred to as being "on" another layer, film, region, or plate, it can be directly on the other layer, film, region, or plate, or intervening layers, films, regions, or plates may also be present therebetween.

Figure 1:
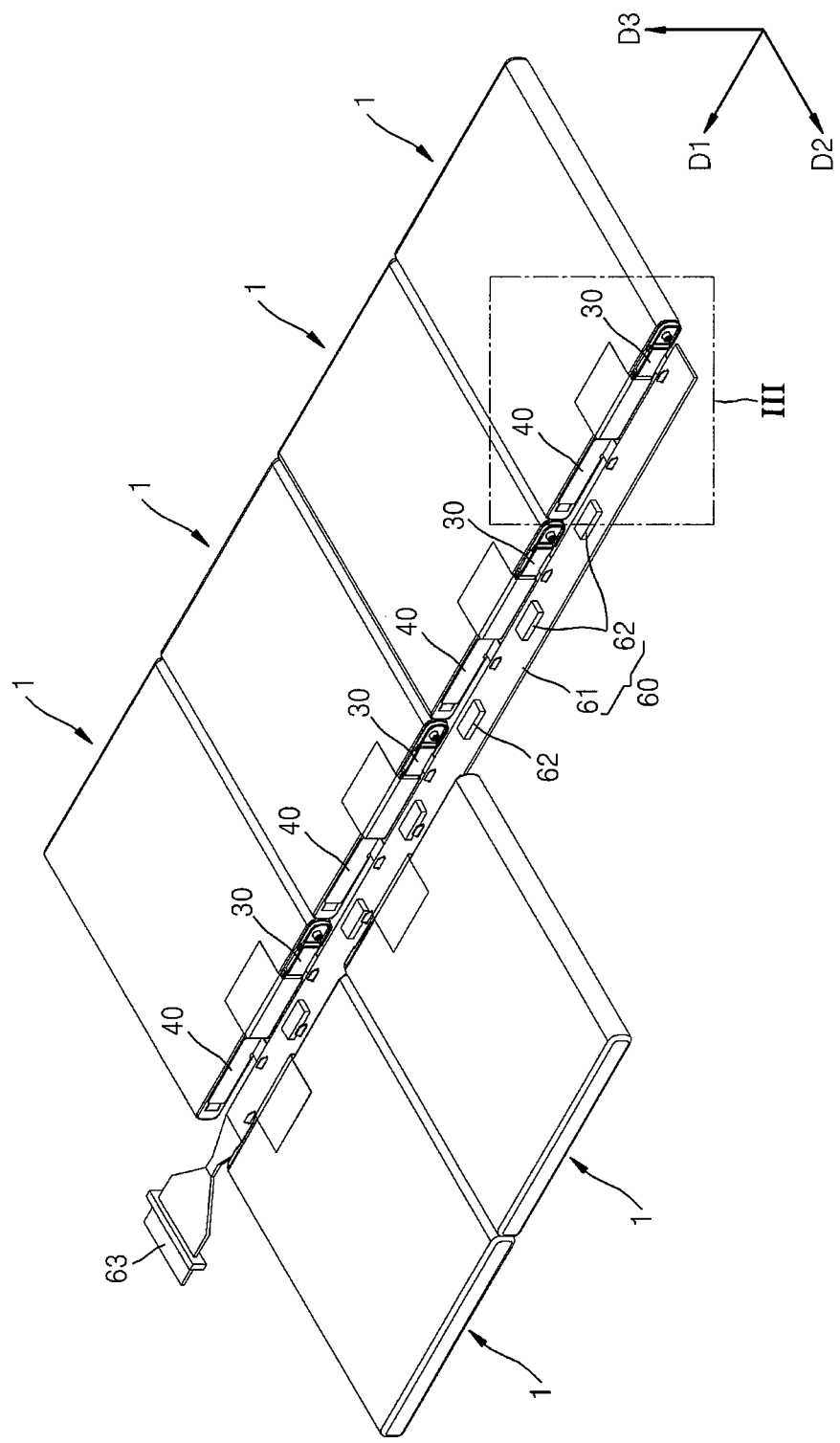
FIG. 1 is a perspective view schematically illustrating a battery pack according to an embodiment of the present invention.
Figure 2:
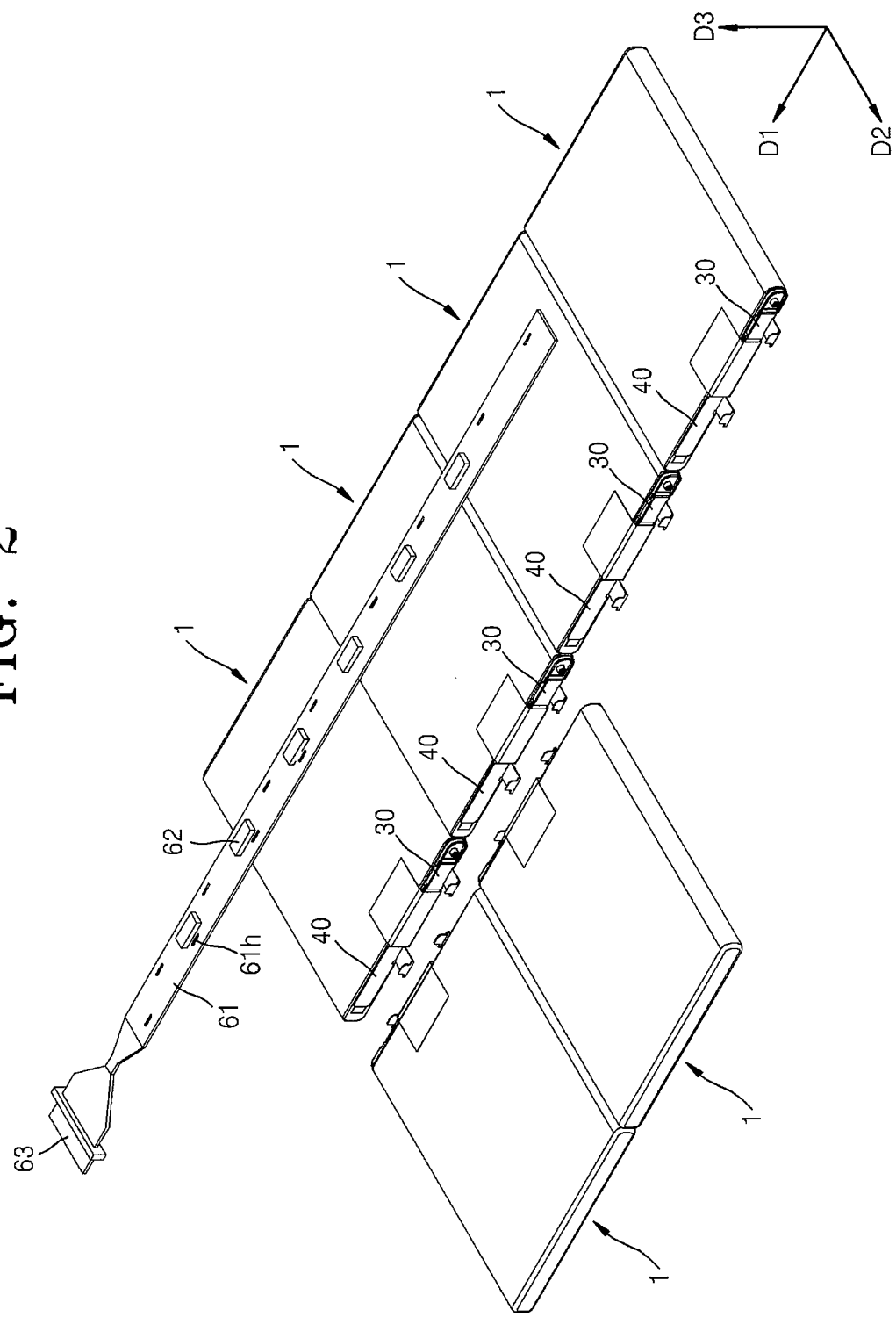
FIG. 2 is a partially exploded perspective view of the battery pack illustrated in FIG. 1.
Figure 3:
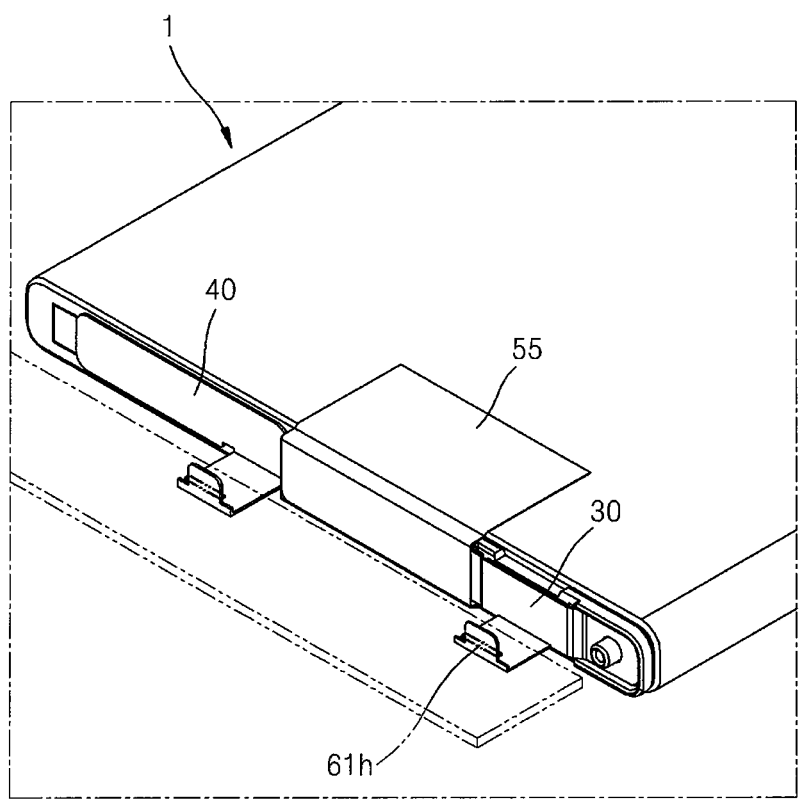
FIG. 3 is an enlarged perspective view of section III of the battery pack illustrated in FIG. 1.

FIG. 1 is a perspective view schematically illustrating a battery pack according to an embodiment of the present invention. FIG. 2 is a partically exploded perspective view of the battery pack illustrated in FIG. 1. FIG. 3 is an enlarged perspective view of section III of the battery pack illustrated in FIG. 1.

Referring to the embodiments illustrated in FIGS. 1 and 2, the battery pack includes a plurality of unit batteries 1 and a protection circuit module 60. Each of the unit batteries 1 in these embodiments includes first and second terminals 30 and 40, and is directly electrically connected to the protection circuit module 60.

Figure 4:
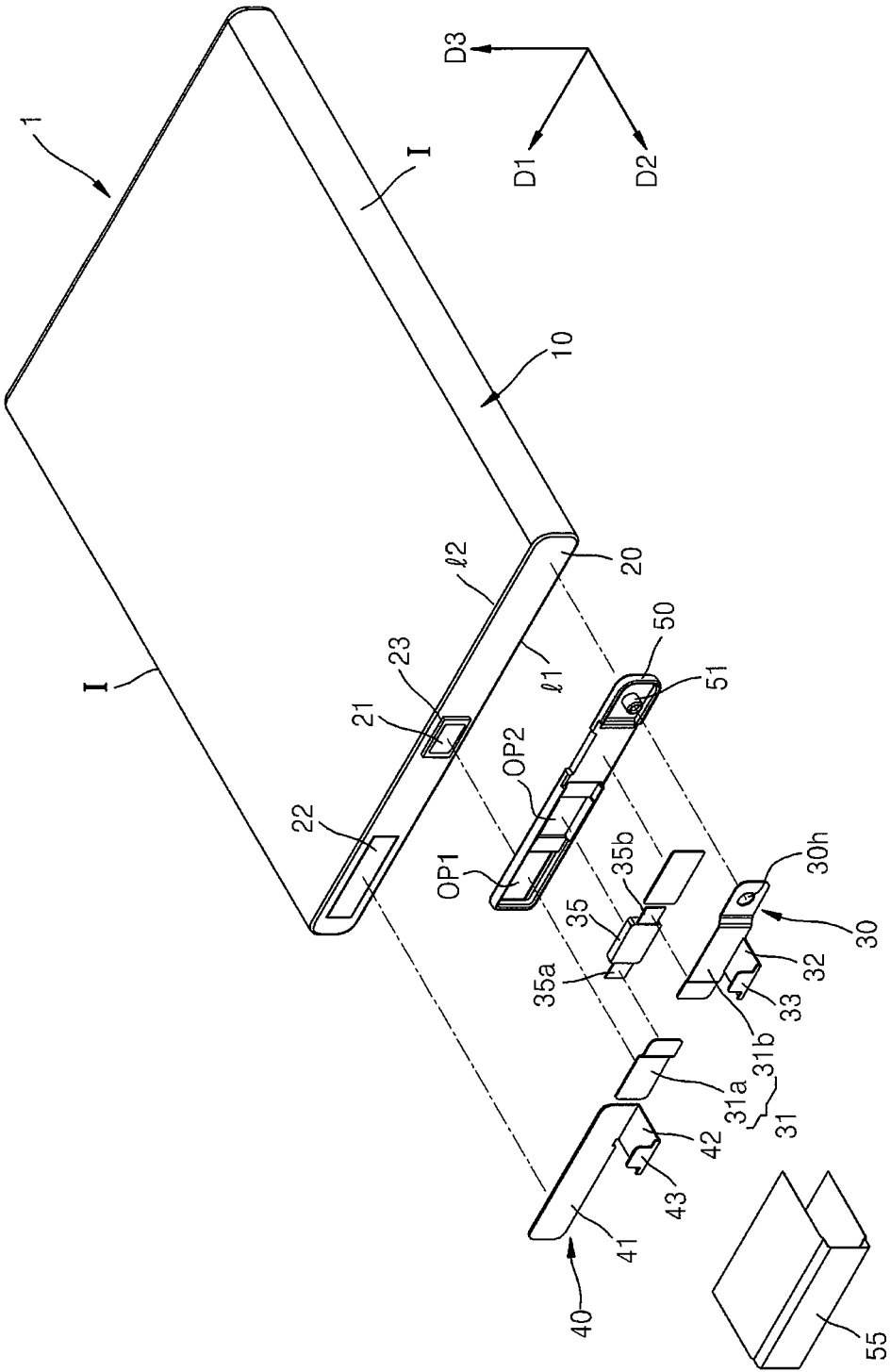
FIG. 4 is an exploded perspective view illustrating a unit battery according to an embodiment of the present invention.

Each of the unit batteries 1 in these embodiments is a rechargeable secondary battery and may be, for example, a lithium-ion battery. In the embodiments illustrated in FIGS. 1 and 2, each of the unit batteries 1 is manufactured to have a prismatic shape, for example, in one embodiment, each unit battery 1 has a substantially hexahedral shape. Each of the unit batteries 1 in these embodiments includes a can 10 (as shown in FIG. 4) and a cap plate 20 (as shown in FIG. 4) sealing a side surface of the can 10. The unit batteries 1 may be arranged side by side in a first direction D1 such that the cap plates 20 are exposed in the same direction, as illustrated in FIG. 1. For example, as shown in the embodiment illustrated in FIG. 1, four unit batteries 1 may be arranged side by side in the first direction D1 such that the cap plates 20 are exposed in a second direction D2, and two unit batteries 1 may be arranged side by side in the first direction D1 such that their cap plates 20 are exposed in an opposite second direction −D2 opposite to the second direction D2.

Although in the embodiment illustrated in FIG. 1 four unit batteries 1 are aligned with their cap plates 20 exposed in the second direction D2, and two unit batteries 1 are aligned with their cap plates 20 exposed in the opposite second direction −D2, to face each other, the number and arrangement of the unit batteries 1 are not limited thereto. Alternatively, in other embodiments, two or more unit batteries 1 may be arranged side by side in the first direction D1, for example.

In the embodiments illustrated in FIGS. 1 and 2, the first terminal 30 and the second terminal 40 are located on a side surface of each of the unit batteries 1, i.e., on the cap plate 20. In these embodiments, either one of the first or second terminals 30 or 40 may be a negative electrode of its respective unit battery 1 with the other terminal 30 or 40 as a positive electrode of the unit battery 1. FIG. 1 will be further described with the assumption that the first terminal 30 is a negative electrode and the second terminal 40 is a positive electrode.

In the embodiment illustrated in FIGS. 1 and 2, the first terminal 30 is located on the cap plate 20 with an end portion of the first terminal 30 positioned away from the cap plate 20 extending toward the protection circuit module 60. In this embodiment, the end portion of the first terminal 30 extending toward the protection circuit module 60 is bent.

In the embodiment illustrated in FIGS. 1 and 2, the second terminal 40 is located on the cap plate 20 with an end portion of the second terminal 40 positioned away from the cap plate 20 extending toward the protection circuit module 60. In this embodiment, the end portion of the second terminal 40 extending toward the protection circuit module 60 is bent.

The bent end portions of the first and second terminals 30 and 40 in the embodiments illustrated in FIGS. 1 and 2 are inserted into terminal holes 61h in the protection circuit module 60. Each of the unit batteries 1 in these embodiments is electrically connected to the protection circuit module 60 when the bent end portions of the first and second terminals 30 and 40 are inserted into the terminal holes 61h.

The protection circuit module 60 may be located adjacent to the cap plates 20 of the unit batteries 1 and may be electrically connected to the unit batteries 1 to control discharging and recharging of the unit batteries 1. In these embodiments, the protection circuit module 60 may, thus, prevent overheating and reduce the risk of explosion caused by an over-recharge, an over-discharge, or an over-current. The protection circuit module 60 in these embodiments includes a circuit board 61 and a plurality of protection devices 62 coupled to the circuit board 61.

in the embodiments illustrated in FIGS. 1 and 2, the circuit board 61 includes at least one terminal hole 61h. The terminal hole 61h may be located at an edge of the circuit board 61, and each of the unit batteries 1 may be directly connected to the protection circuit module 60 at the terminal hole 61h when the first and second terminals 30 and 40 are inserted into the terminal holes 61h.

As shown in the embodiment illustrated in FIG. 3, the bent end portions of the first and second terminals 30 and 40 may be inserted into the terminal holes 61h in the circuit board 61, and, in an embodiment, the terminal holes 61h may have slit shapes extending along the first direction D1. In this embodiment, the bent end portion of the first terminal 30 and the bent end portion of the second terminal 40 are each inserted into their respective terminal holes 61h and soldered.

Since each of the unit batteries 1 in the embodiments illustrated in FIGS. 1-3 is directly connected to the protection circuit module 60 through the first and second terminals 30 and 40 provided on the cap plate 20, the recharging and discharging of each of the unit batteries 1 may be controlled by the protection circuit module 60, and each of the unit batteries 1 may be connected in parallel and/or series through wires on the protection circuit module 60. In this embodiment, because each of the unit batteries 1 is directly connected to the protection circuit module 60, an intermediate member for connecting the plurality of unit batteries 1 in parallel and/or series is not necessary. Accordingly, in this embodiment, an additional space to accommodate the intermediate member is not necessary, allowing for a reduction in the total number of parts necessary for manufacturing the battery pack according to the embodiments of the present invention.

In the embodiments illustrated in FIGS. 1-3, the circuit board 61 is located adjacent to the cap plate 20, and extends along the first direction D1. In this embodiment, the circuit board 61 may be located on a plane adjacent to second surfaces 32 and 42 (as shown in FIG. 4) of the first and second terminals 30 and 40, respectively, which may be located, for example, on substantially the same plane as a bottom surface of each of the unit batteries 1. In embodiments where the circuit board 61 is located in the manner described above, a space may be formed between a top surface of the circuit board 61 and the cap plate 20, and the plurality of protection devices 62 may be positioned in this space. A height of each of the protection devices 62 may be equal to or less than a thickness of each of the unit batteries 1, measured as a distance between a first long side l1 and a second long side l2 opposite the first long side l1 of the cap plate 20 (as shown in FIG. 4). In this embodiment, the protection devices 62 may be effectively coupled to the circuit 61 without increasing a thickness or a width of the battery pack.

The protection device 62 in these embodiments may include a safety element, for example a passive element such as a resistor or a condenser, and an active element such as a field-effect transistor (FET), or integrated circuits. The protection circuit module 60 in these embodiments may further include a connector 63 for supplying power to an external electronic device. The connector 63 may be located at a side of the protection circuit module 60.

A structure of each of the unit batteries 1 including the first and second terminals 30 and 40 will be explained in further detail below with reference to the embodiments illustrated in FIG. 4.

FIG. 4 is an exploded perspective view illustrating a unit battery according to an embodiment of the present invention.

Referring to the embodiment illustrated in FIG. 4, the unit battery 1 includes the can 10, including an electrode assembly received through an opening in the can 10, the cap plate 20, sealing the opening of the can 10, and the first and second terminals 30 and 40.

In the embodiment illustrated in FIG. 4, the can 10 has a substantially hexahedral shape with an opening at one side, and may be formed of a metal material, increasing its strength. For example, in one embodiment, the can 10 may be formed of aluminum or an aluminum alloy. After the electrode assembly is inserted into the can 10, the opening may be sealed by the cap plate 20. The cap plate 20, like the can 10, may be formed of a metal material such as aluminum or an aluminum alloy. Points of contact between the cap plate 20 and the can 10, in some embodiments, may be coupled by laser welding to maintain a sealing engagement.

In some embodiments, each of the can 10 and the cap plate 20 is formed of a metal material, however no insulating films or labels surround an outer circumferential surface of the can 10. Accordingly, in these embodiments, when the unit batteries 1 are arranged side by side as shown in FIG. 1, since short-circuit may occur between adjacent unit batteries 1 having no, facing surfaces of the adjacent unit batteries 1, having no insulation films or labels surrounding the outer surface of the can 10, may require insulation from each other to prevent short-circuiting. For example, in some embodiments, both side surfaces of the can 10 which are exposed in the first direction D1 along the second direction D2 may be insulated by using an insulating tape I. Alternatively, in other embodiments, both side surfaces of the can 10 may be insulated by placing an insulating barrier between adjacent unit batteries 1.

In the embodiments shown in FIGS. 1-4, the electrode assembly may include a first electrode plate and a second electrode plate each coated with an electrode active material, and a separator located between the first and second electrode plates. The electrode assembly may be manufactured by sequentially stacking the first electrode plate, the separator, and the second electrode plate, and winding the first electrode plate, the separator, and the second electrode plate in a jelly roll shape.

Although the electrode assembly described above may have a jelly roll shape, the embodiments of the present invention are not limited thereto. Alternatively, in some embodiments, for example, the electrode assembly may have a stacked structure in which the first electrode plate, the separator, and the second electrode plate are sequentially stacked.

In the embodiments shown in FIG. 4, an electrode pin 21 is formed on the cap plate 20. In these embodiments, the first electrode plate of the electrode assembly is electrically connected to the electrode pin 21, and the second electrode plate is electrically connected to the cap plate 20. Since first electrode plate and the second electrode plate have different polarities, the electrode pin 21 and the cap plate 20 in these embodiments have different polarities. For example, in one embodiment, the electrode pin 21 may have the polarity of a negative electrode, and the cap plate 20 may have the polarity of a positive electrode. In this embodiment, a gasket 23 may be positioned between the electrode pin 21 and the cap plate 20 in order to prevent a short-circuit between the electrode pin 21 and the cap plate 20. The gasket 23 in this embodiment may be formed of an insulating material preventing a short-circuit between the electrode pin 21 and the cap plate 20.

In the embodiments shown in FIG. 4, the first terminal 30 and the second terminal 40 are located on the cap plate 20. In these embodiments, the first terminal 30 is located on a portion (first area) of the cap plate 20, and the second terminal 40 is located on a different portion (second area) of the cap plate 20. In an embodiment, the first terminal 30 may be positioned on the first area of the cap plate 20 to be electrically connected to the electrode pin 21, and the second terminal 40 may be positioned on the second area of the cap plate 20 to be electrically connected to the cap plate 20. In this embodiment, a connection piece 22 may be coupled to the cap plate 20 in order to improve a welding surface between the cap plate 20 and the second terminal 40, which may each be formed of different materials. The connection piece 22 may be formed of the same material as the second terminal 40. For example, in an embodiment, both the connection piece 22 and the first and second terminals 30 and 40 may nickel.

In the embodiments shown in FIG. 4, the first terminal 30 may include a first surface 31 parallel to the cap plate 20, the second surface 32 bent away from the first surface 31, and a third surface 33 bent away from the second surface 32 and substantially parallel to the first surface 31.

In the embodiments shown in FIG. 4, the first terminal 30 may include a temperature cutoff (TCO) 35. In this embodiment, the first surface 31 of the first terminal 30 may be divided into a first portion 31a and a second portion 31b. The first portion 31a and the second portion 31b may be located on the same plane, and the TCO 35 may be electrically connected to the first surface 31 of the first terminal 30 between the first portion 31a and the second portion 31b. For example, in an embodiment, a first end 35a of the TCO 35 may be connected to an end of the first portion 31a of the first surface 31, and a second end 35b of the TCO 35 may be connected to an end of the second portion 31b of the first surface 31, as shown in FIG. 4.

Since the first terminal 30 shown in the embodiments illustrated in FIGS. 1-4 is electrically connected to the electrode pin 21, the first terminal 30 in these embodiments has a negative electrode polarity. In contrast, since the cap plate 20 shown in the embodiments illustrated in FIGS. 1-4 has a positive electrode polarity, a short-circuit may easily occur between the cap plate 20 and the first terminal 30 that is located on the cap plate 20. Accordingly, in these embodiments, a holder 50 may be positioned between the first terminal 30 and the cap plate 20 to electrically insulate between the first terminal 30 and the cap plate 20 (as shown in FIG. 4).

The holder 50 in the embodiments illustrated in FIG. 4 is directly located on the cap plate 20, and includes a first opening OP1 through which the first surface 31 of the first terminal 30 is electrically connected to the electrode pin 21. The holder 50 may further include a second opening OP2 located on a surface of the holder 50 facing the TCO 35, allowing the TCO 35 coupled to the first terminal 30 to effectively respond to a temperature of the unit battery 1.

The holder 50 shown in the embodiments of FIG. 4 may include a protrusion 51 for coupling the holder 50 with the first terminal 30. In an embodiment where the first terminal 30 is mounted to the holder 50, the first portion 31a of the first surface 31 of the first terminal 30 may be welded to the electrode pin 21, and the second portion 31b of the first surface 31 of the first terminal 30 may be coupled to the protrusion 51. A hole 30h may be formed in the second portion 31b of the first surface 31. In this embodiment, when the protrusion 51 is inserted into the hole 30h and heat is applied to a portion of an upper end of the protrusion 51, the portion of the upper end of the protrusion 51 may melt, coupling the first terminal 30 to the holder 50. A tape 55 coupled to the holder 50 may be further attached to the unit battery 1, as shown in the embodiments illustrated in FIGS. 3 and 4, in order to prevent the first terminal 30 that is coupled to the holder 50 and welded to the electrode pin 21 from separating from the unit battery 1.

In the embodiments illustrated in FIG. 4, the second surface 32 of the first terminal 30 may be bent in a direction substantially perpendicular to the first surface 31, and the third surface 33 may be bent in a direction substantially perpendicular to the second surface 32. In these embodiments, the second surface 32 is adjacent to the first long side £1 of the cap plate 20. The third surface 33 of the first terminal 30 in these embodiments is inserted as an end portion of the first terminal 30 into the terminal hole 61h of the protection circuit module 60, as described above with reference to FIGS. 1 through 3.

In the embodiments illustrated in FIG. 4, the second terminal 40 may include a first surface 41 parallel to the cap plate 20, a second surface 42 bent away from the first surface 41, and a third surface 43 bent away from the second surface 42 and substantially parallel to the first surface 41. The second surface 42 of the second terminal 40 may be bent in a direction substantially perpendicular to the first surface 41, and the third surface 43 may be bent in a direction substantially perpendicular to the second surface 42. The third surface 43 of the second terminal 40 in these embodiments is inserted as an end portion of the second terminal 40 into the terminal hole 61h of the protection circuit module 60, as described above with reference to FIGS. 1 through 3.

According to the one or more embodiments of the present invention, since each of unit batteries 1 is directly connected to a protection circuit module 60 through first and second terminals 30 and 40, the unit batteries 1 may be controlled by the protection circuit module 60 to be discharged and recharged, and may be connected in parallel and/or series through wires on the protection circuit module 60. Accordingly, an intermediate member for connecting the plurality of unit batteries 1 in parallel and/or series is not necessary, and an additional space for the intermediate member is also not necessary, making it possible to reduce the total number of parts for manufacturing a battery pack.

While the present invention has been particularly shown and described with reference to embodiments thereof, the embodiments are provided for the purposes of illustration, and it should be understood by those of ordinary skill in the art that various modifications and equivalent other embodiments may be made from the present invention.

DESCRIPTION OF REFERENCE NUMERALS

1: unit battery
10: can
20: cap plate
21: electrode pin
22: connection piece
23: gasket 30: first terminal
30h: hole formed in the second portion of the first surface
31: first surface of the first terminal
31a: first portion of the first surface of the first terminal
31b: second portion of the first surface of the first terminal
32: second surface of the first terminal
33: third surface of the first terminal (end portion of the first terminal)
35: temperature cutoff (TCO)
35a: first end of the TCO
35b: second end of the TCO
40: second terminal
41: first surface of the second terminal
42: second surface of the second terminal
43: third surface of the second terminal (end portion of the second terminal)
50: holder
51: protrusion
55: a tape fixed to the holder
OP1: first opening on the holder
OP2: second opening on the holder
60: protection circuit module
61: circuit board
61h: terminal hole
62: protection device
63: connector
I: insulating tape

What is claimed is:

1. A battery pack comprising:
 a plurality of unit batteries, at least some unit batteries being arranged side-by-side;
 a protection circuit module comprising a circuit board and a protection device coupled to the circuit board;
 a first terminal coupled to one of the unit batteries and the protection circuit module; and
 a second terminal coupled to the one of the unit batteries and the protection circuit module,
 wherein each of the unit batteries comprises:
  a can having an opening and accommodating an electrode assembly, the electrode assembly comprising a first electrode plate, a second electrode plate, and a separator between the first electrode plate and the second electrode plate;
  a cap plate sealing the opening, the first terminal being on a first area of the cap plate and the second terminal contacting a second area of the cap plate;
  an electrode pin over the cap plate, one end of the first terminal being connected to the electrode pin and another end of the first terminal extending in a first direction that is a length direction of the cap plate such that the other end of the first terminal faces an upper surface of the cap plate;
  a gasket between the electrode pin and the cap plate and insulating the electrode pin from the cap plate; and
  a holder disposed between the first terminal and the first area of the cap plate such that a bottom surface of the holder faces the upper surface of the cap plate, the holder surrounding a periphery of the first terminal, insulating the other end of the first terminal from the cap plate, and having an opening exposing the electrode pin,
 wherein at least one of the first terminal or the second terminal is bent, and the at least one of the first terminal or the second terminal comprises:
  a first portion extending in the first direction and being on the cap plate, a width of the first portion being less than or equal to that of the cap plate;
  a second portion bent away from the first portion and extending in a second direction that is parallel to an upper surface of the circuit board, the second portion having a length in the first direction that is less than that of the first portion; and
  a third portion bent from the second portion, and
 wherein the protection circuit module is adjacent to the cap plate of each of the unit batteries.

2. The battery pack of claim 1, wherein the circuit board comprises at least one terminal opening, and
 wherein an end portion of at least one of the first terminal or the second terminal is coupled to the terminal opening.

3. The battery pack of claim 1, wherein the second portion is adjacent to a first long side of the cap plate, and
 wherein the circuit board is on a plane substantially parallel to the second portion.

4. The battery pack of claim 3, wherein a height of the protection device is equal to or less than a distance between the first long side of the cap plate and a second long side of the cap plate parallel to the first long side and opposite to the first long side about the cap plate.

5. The battery pack of claim 1, wherein the circuit board has at least one terminal opening, and
 wherein the third portion of the at least one of the first terminal or the second terminal is coupled to the circuit board at the terminal opening to electrically couple the at least one of the first terminal or the second terminal to the circuit board.

6. The battery pack of claim 1, wherein the electrode pin has a first polarity, and
 wherein the cap plate has a second polarity that is different from the first polarity.

7. The battery pack of claim 6, wherein the first terminal electrically couples the electrode pin and the protection circuit module, and
 wherein the second terminal electrically couples the cap plate and the protection circuit module.

8. The battery pack of claim 1, wherein the first terminal further comprises a temperature cutoff.

9. The battery pack of claim 1, wherein facing surfaces of adjacent unit batteries from among the plurality of unit batteries are insulated from each other.

10. The battery pack of claim 1, wherein the protection circuit module is disposed such that the circuit board is substantially perpendicular to the cap plate.

11. The battery pack of claim 1, wherein the second terminal comprises a first portion, and
 wherein the first portion of the second terminal directly contacts the cap plate.

* * * * *